M. B. A. DORING.
WIRE NETTING MACHINE.
APPLICATION FILED DEC. 18, 1914.
1,259,378.
Patented Mar. 12, 1918.
10 SHEETS—SHEET 3.
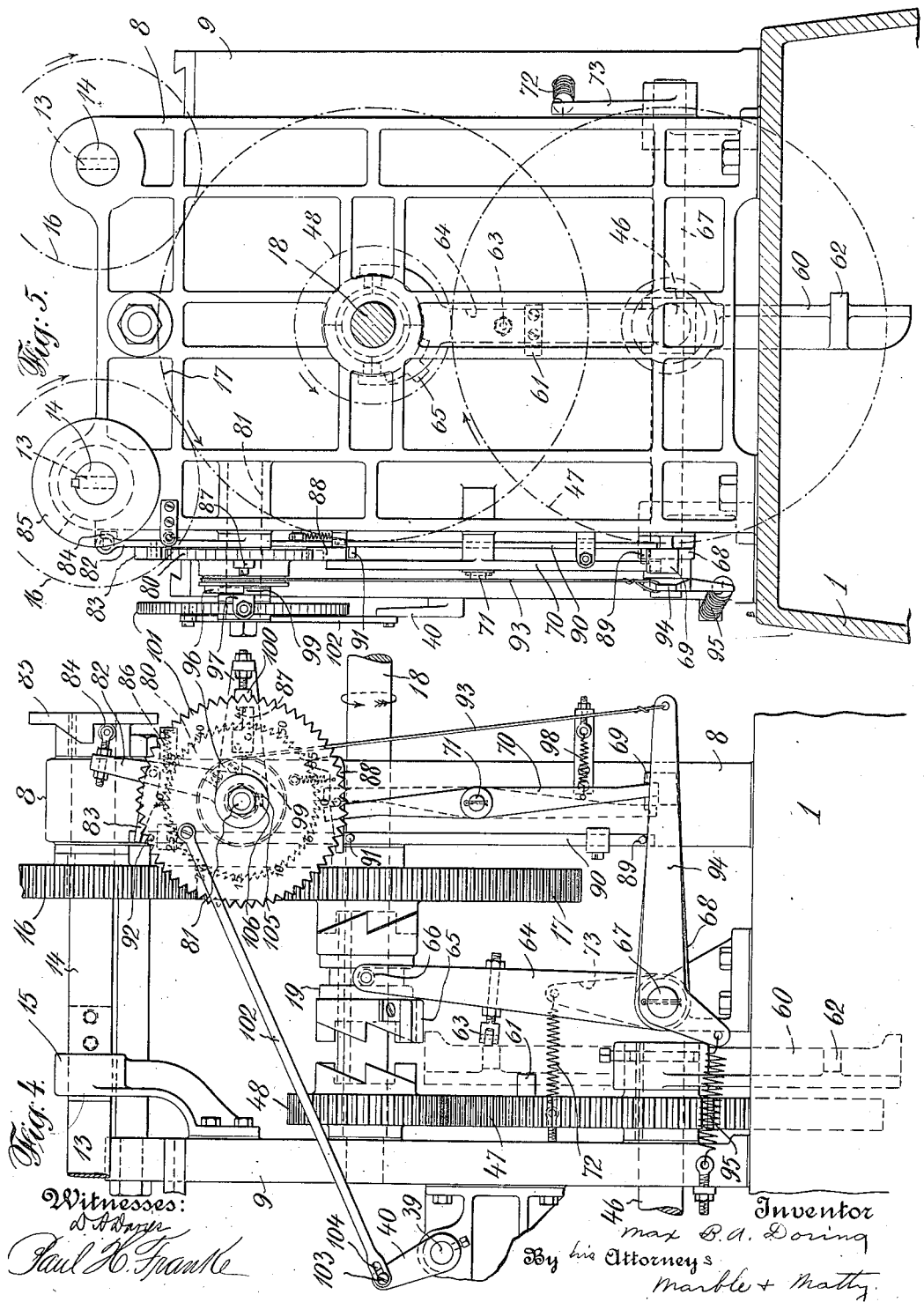

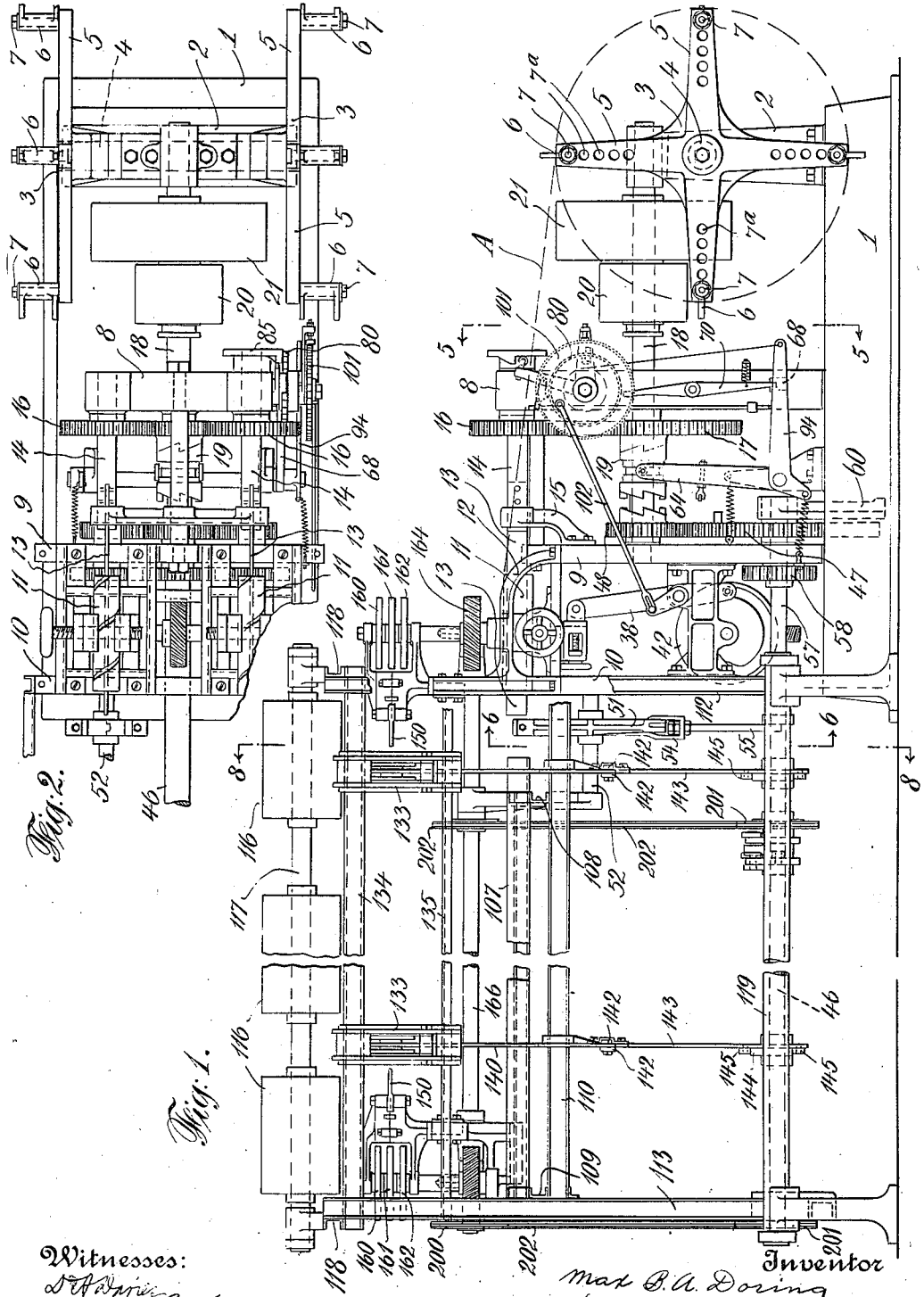

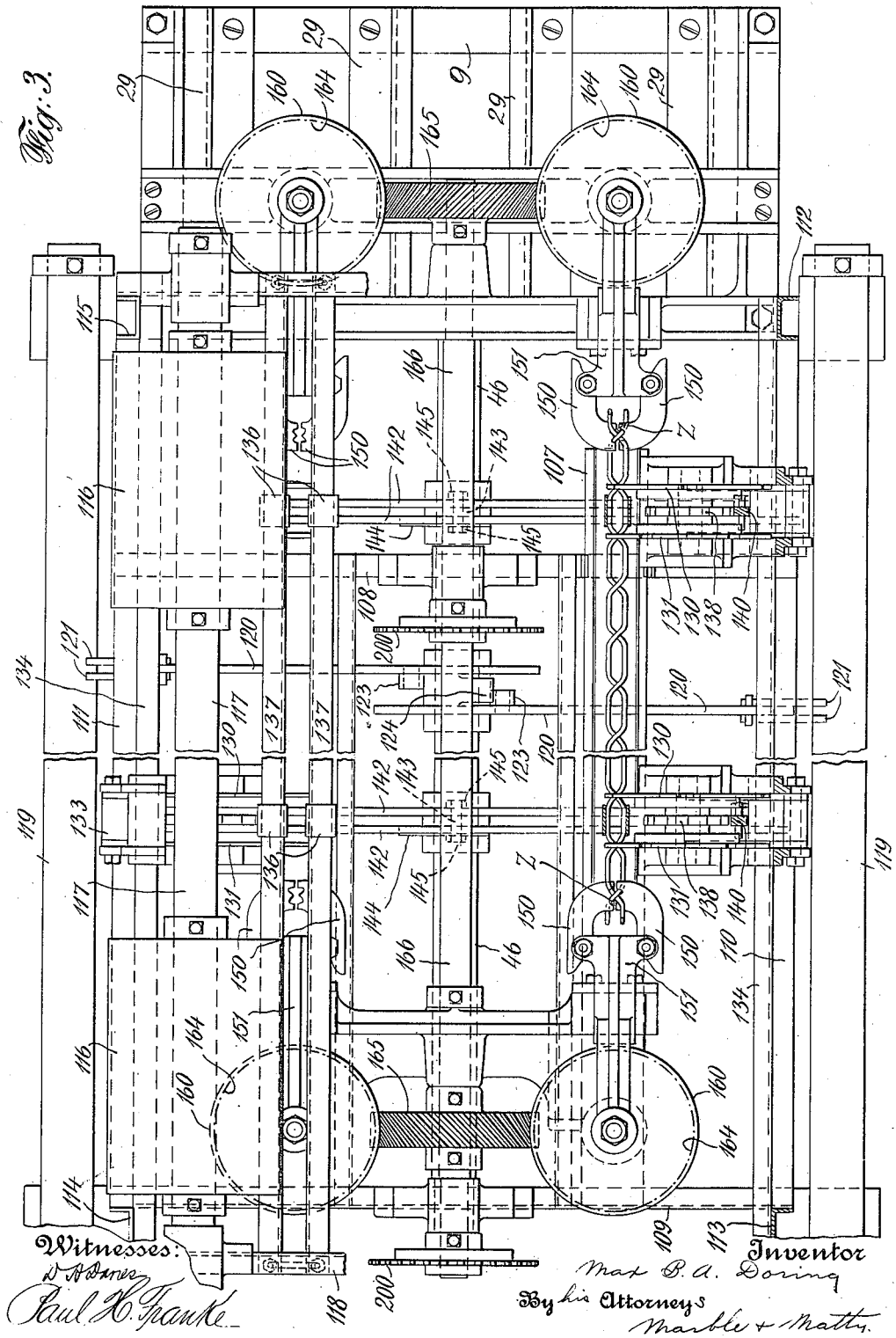

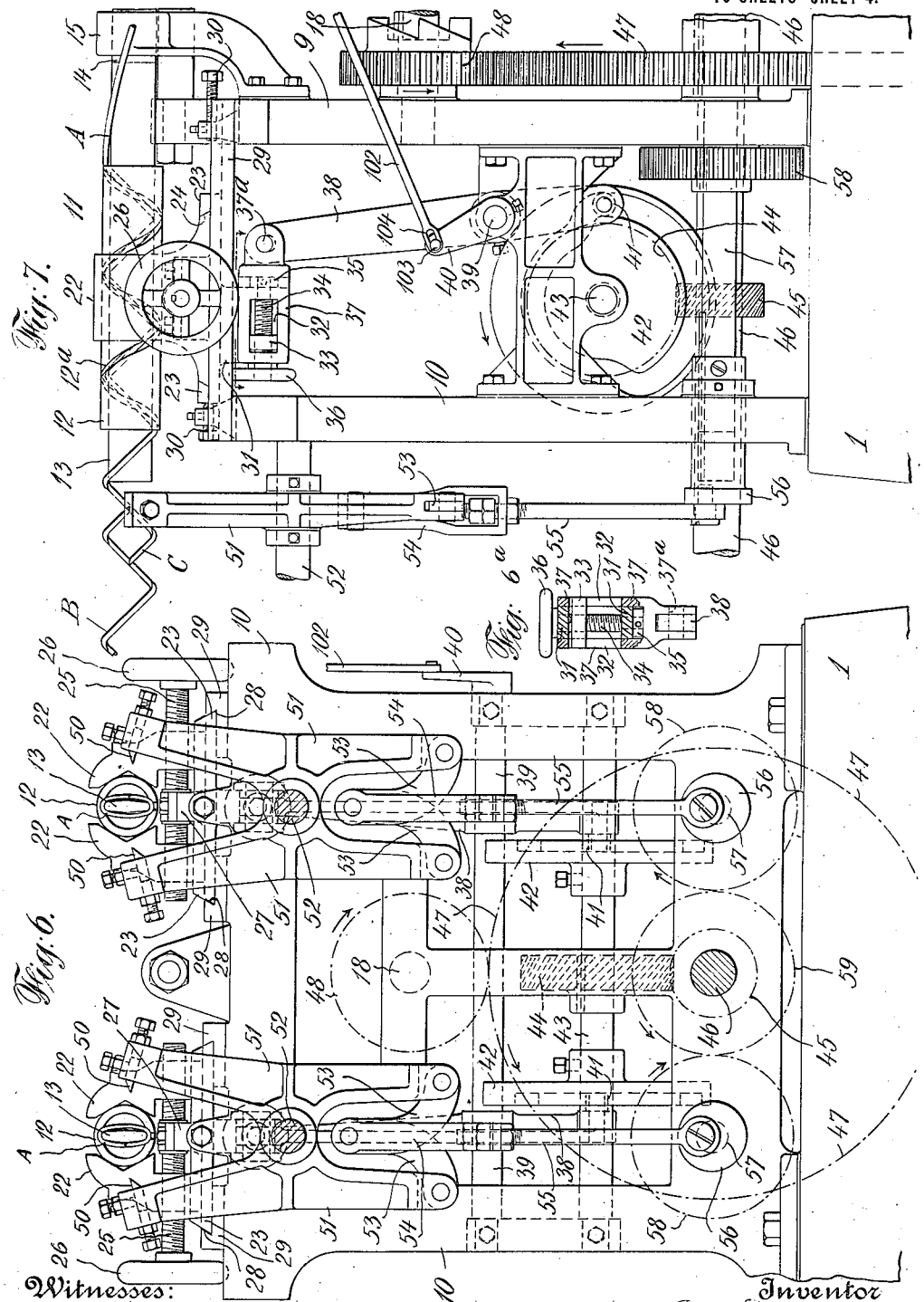

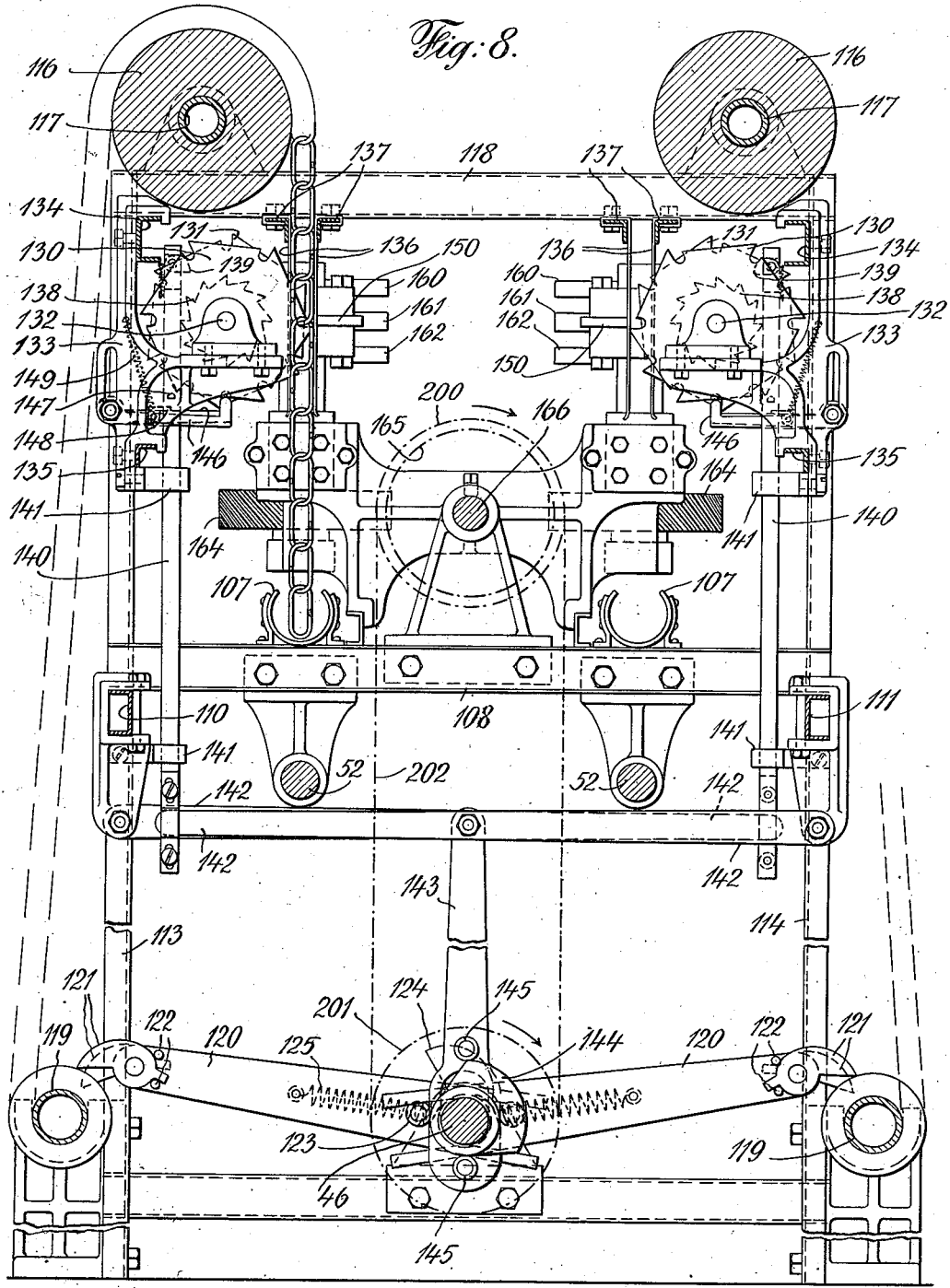

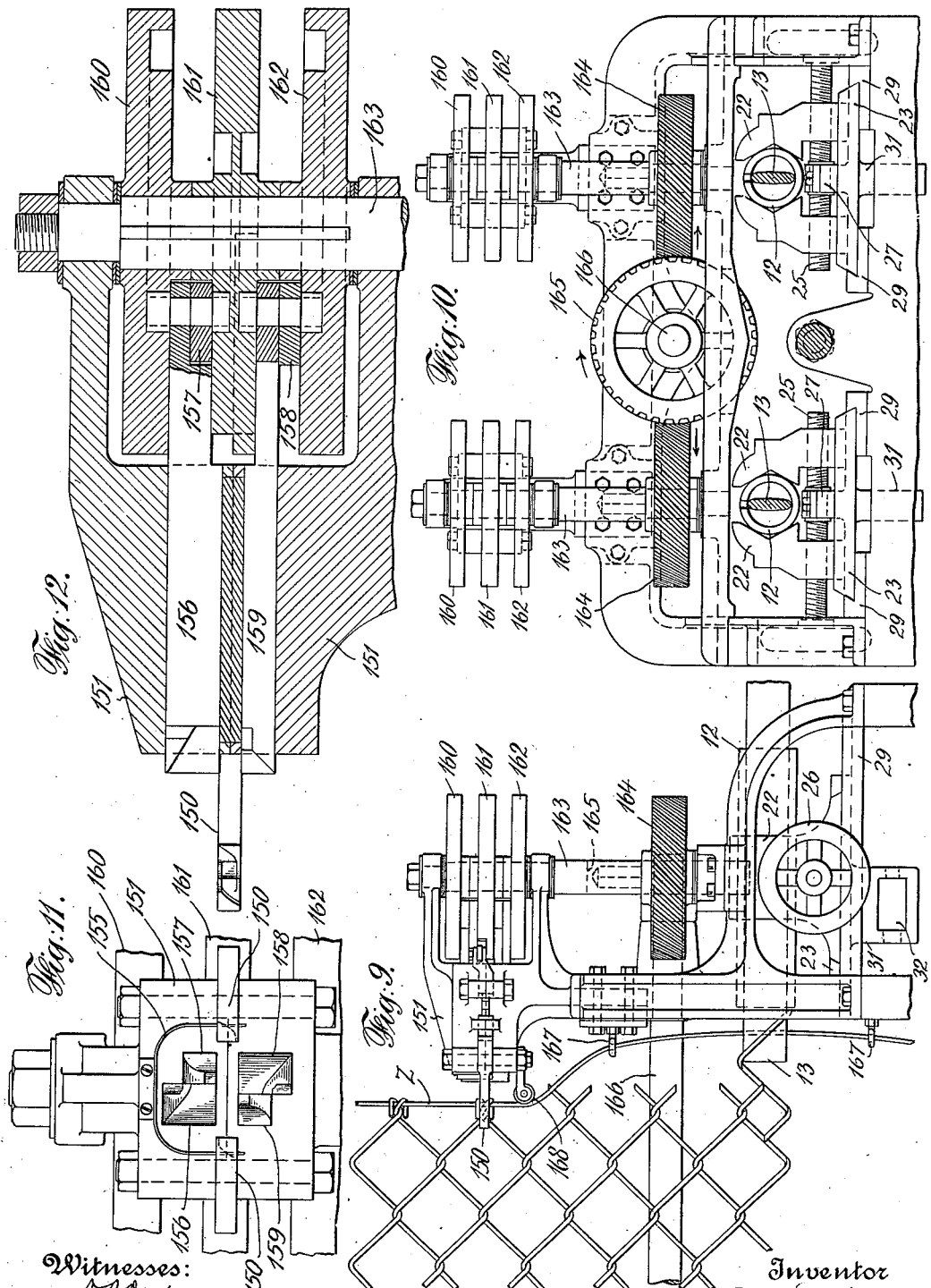

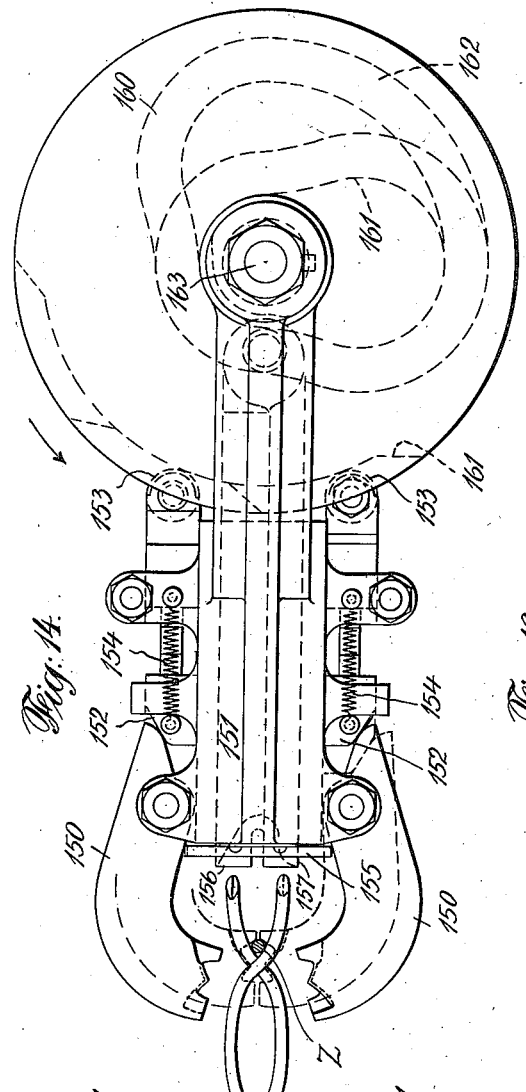
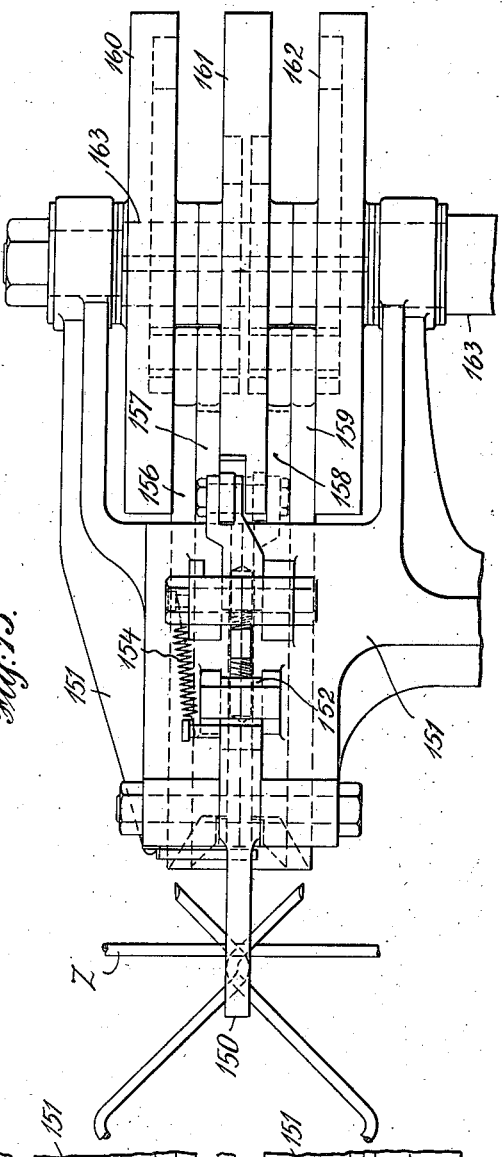
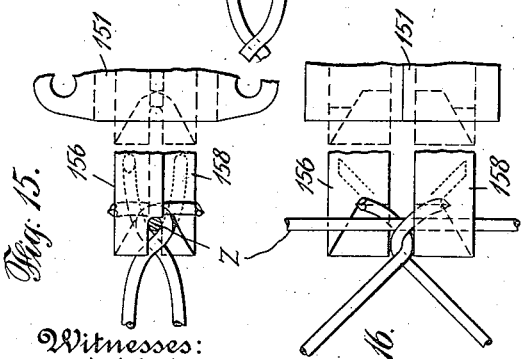
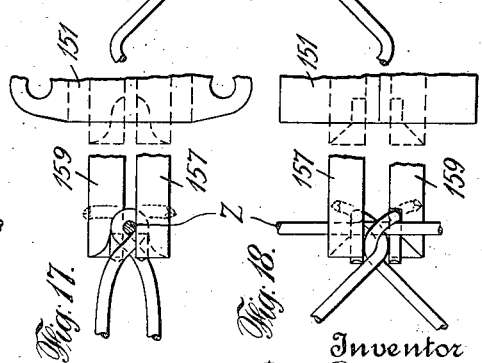

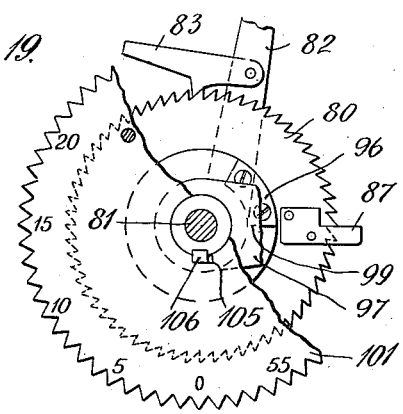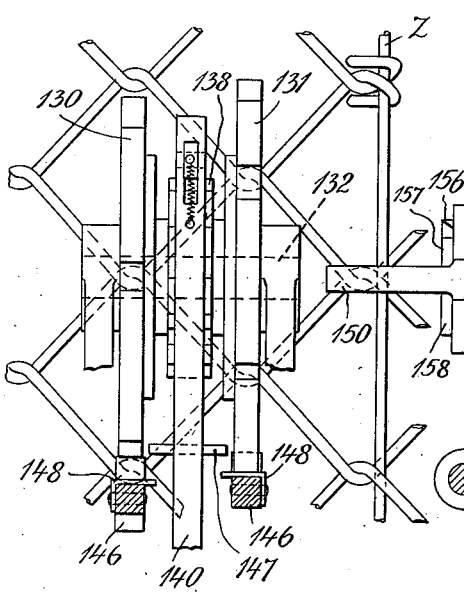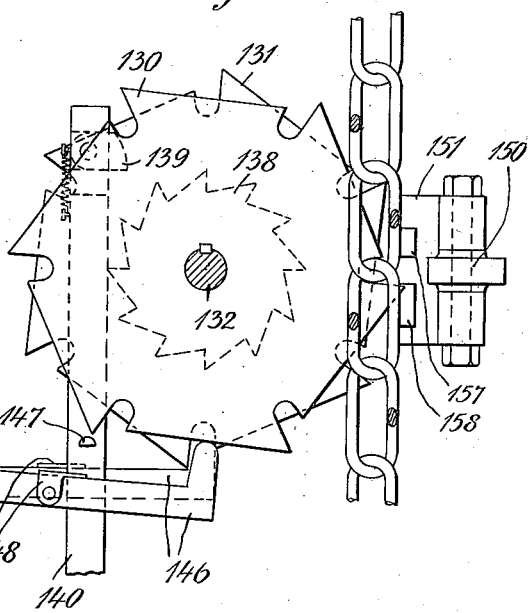

M. B. A. DORING.
WIRE NETTING MACHINE.
APPLICATION FILED DEC. 18, 1914.

1,259,378.

Patented Mar. 12, 1918.

Witnesses:

Inventor
Max B. A. Doring
By his Attorneys

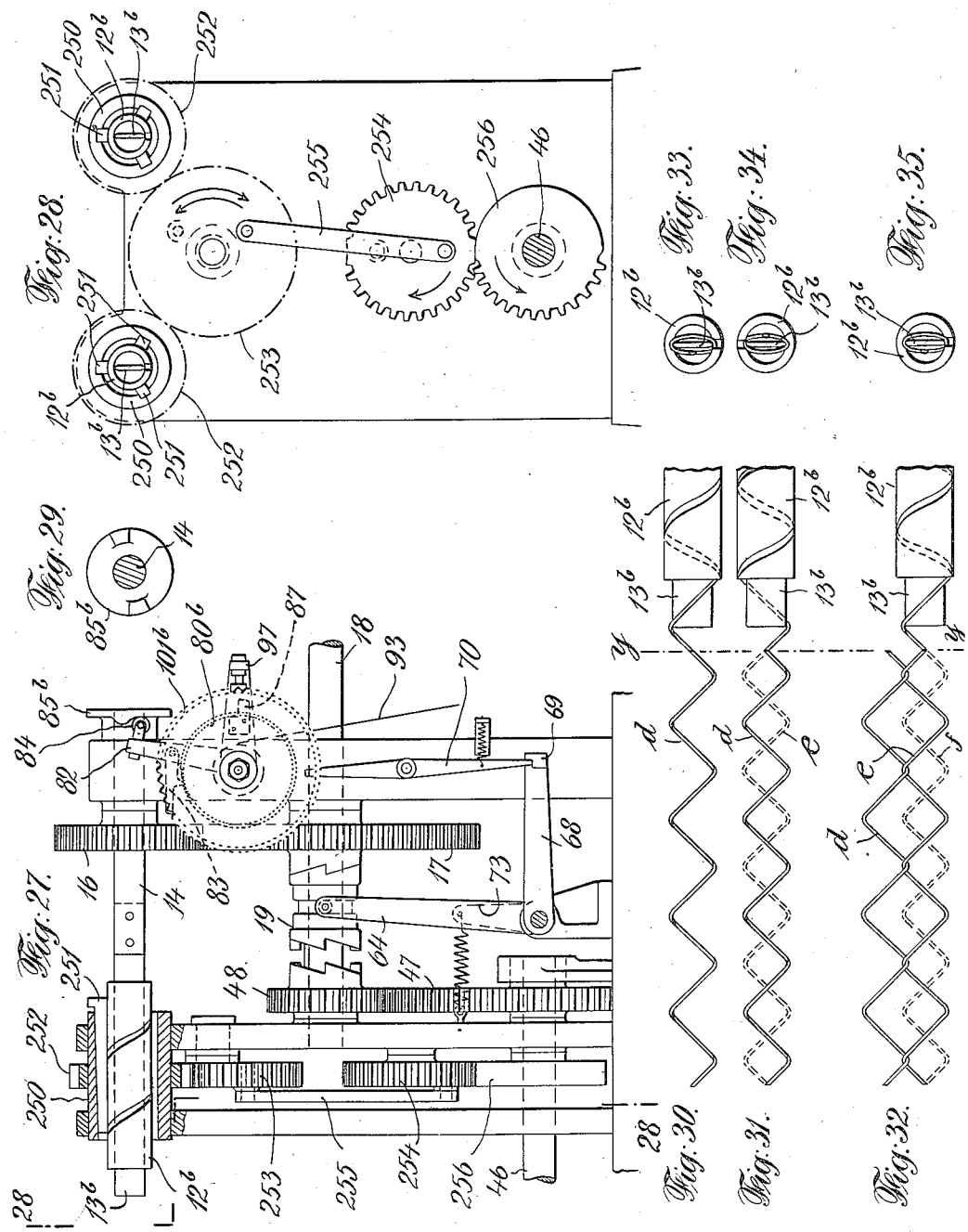

UNITED STATES PATENT OFFICE.

MAX B. A. DORING, OF BROOKLYN, NEW YORK, ASSIGNOR OF ONE-EIGHTH TO HARRY M. MARBLE, OF NEWARK, NEW JERSEY, AND ONE-EIGHTH TO LEO J. MATTY, OF NEW YORK, N. Y.

WIRE-NETTING MACHINE.

1,259,378.  Specification of Letters Patent.  Patented Mar. 12, 1918.

Application filed December 18, 1914. Serial No. 877,897.

*To all whom it may concern:*

Be it known that I, MAX B. A. DORING, a citizen of the Empire of Germany, and a resident of Brooklyn, county of Kings, State of New York, have invented certain new and useful Improvements in Wire-Netting Machines, of which the following is a specification.

This invention relates to a machine for making wire netting such as is used for wire fences, bed-springs, reinforcements and various other purposes.

The objects of the invention are, to produce a machine that is inexpensive, with few and simple parts, having a maximum capacity and automatic in its action; to avoid lateral shifting of the woven material as an incident to the weaving thereof, to provide a simple selvage wire device for automatically attaching a selvage wire to the netting; to produce a double machine capable of making two independent nettings at the same time; and to make the machine readily adjustable for the weaving of different sizes or meshes of nettings.

To the accomplishment of the above objects, and to such others as may hereinafter appear, the machine shown in the accompanying drawings includes first, a wire coiling device and means for automatically controlling said device to interweave the separate wire sections and make them of equal length; which wire coiling device is preferably so constructed as hereinafter described, that lateral shifting of the material just woven, as an incident to the interweaving of the separate wire sections, is avoided; second, a lifting device and means for automatically controlling said device to lift the netting as the same is woven; third, a wire cutting device and means for automatically controlling said device to cut off the wire sections; fourth, a selvage wire device and means for automatically controlling said device to attach a selvage wire to the side of the netting; fifth, a take-up device and means for automatically controlling said device to take up the end of the netting; also suitable means for coördinating the operation of the various sub-mechanisms above mentioned for timing their operations properly, and for permitting adjustment of the machine to the weaving of netting of different meshes and from wires of different sizes.

The machine shown in the accompanying drawings also includes a double machine capable of making two independent nettings at the same time and has first, two separate wire coiling devices and single means for automatically controlling both coiling devices; second, two separate lifting devices and single means for automatically controlling both lifting devices; third, two separate wire cutting devices and single means for automatically controlling both wire cutting devices; fourth, two separate selvage wire devices and single means for automatically controlling both selvage wire devices; fifth, two take-up devices and single means for automatically controlling both take-up devices.

In the drawings:

Figure 1 is a side elevation of a machine made in accordance with the invention.

Fig. 2 is a top plan view of the rear portion of the machine.

Fig. 3 is a top plan view of the front part of the machine on a larger scale than the preceding views.

Fig. 4 is a side view of the timing device and operating parts on an enlarged scale.

Fig. 5 is a rear view of the timing device taken on the line 5—5 of Fig. 1.

Fig. 6 is a front view of the cutting devices taken on the line 6—6 of Fig. 1.

Fig. 6ª is a detail bottom view of a portion of the device for vibrating the wire coiling device.

Fig. 7 is a side view of the parts shown in Fig. 6.

Fig. 8 is a rear view of the lifting devices and take-up devices taken on the line 8—8 of Fig. 1.

Fig. 9 is an enlarged detail side view of the selvage wire device.

Fig. 10 is a rear view of the parts shown in Fig. 9.

Figs. 11, 12, 13 and 14 are enlarged detail views of the selvage wire device.

Figs. 15, 16, 17 and 18 are detail views illustrating the operation of the selvage wire device.

Fig. 19 is a detail view of a portion of the timing device.

Figs. 20 and 21 are detail views of the wire lifting devices.

Figs. 22–25 are detail views illustrating the building up or interweaving of the netting.

Figure 26:
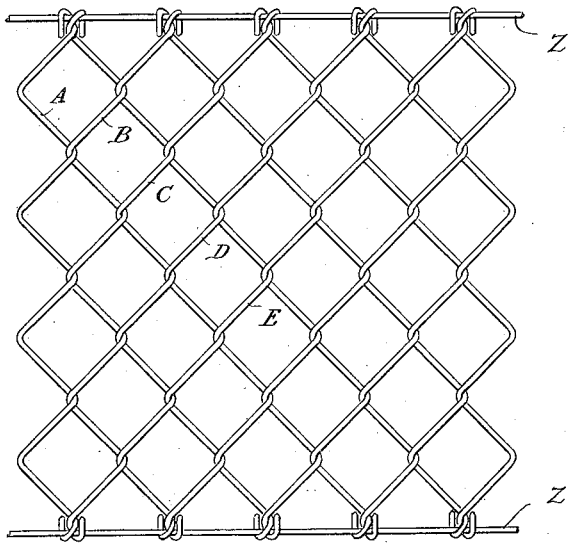

Fig. 26 is a detail view of one form of netting made in the machine.

Fig. 27 is a side view of an alternate form of wire coiling device and timing device with operating parts.

Fig. 28 is an end view of the wire coiling device and operating parts taken on the line 28—28 of Fig. 27.

Fig. 29 is an end view of the cam 85$^b$.

Figs. 30 to 35 are detail views illustrating the building up or interweaving of the netting.

Figure 22:
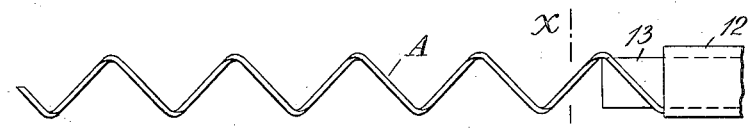
Figure 23:
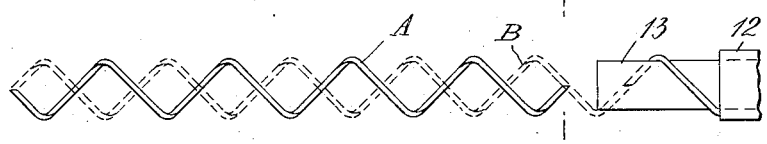
Figure 24:
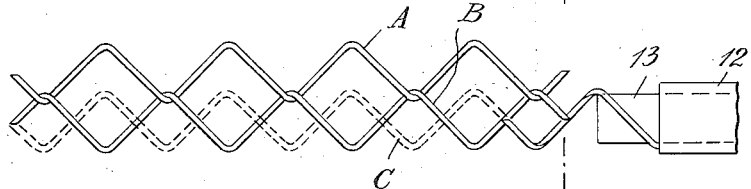
Figure 25:
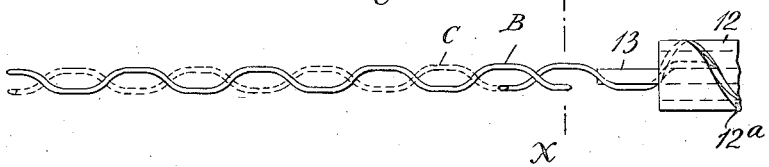

The construction of the machine, particularly the wire coiling and wire-interweaving mechanism, can best be understood if the type of netting made by the machine and the manner of interweaving the wire sections of that netting, is first explained; therefore reference is made first to Fig. 26, showing a portion of the netting and to Figs. 22–25 inclusive, illustrating schematically the manner of interweaving the wire sections which make up the netting. As shown particularly in Fig. 26 the netting consists of a plurality of zigzag wire sections A, B, C, etc., extending transversely of the netting and clenched at their ends to selvage wires Z. In this netting there are no separate warp and woof wires (except as possibly the selvage wires Z may be understood to be warp wires; in which case the transverse wires A, B, C etc., may be considered woof wires). But the wire sections A, B and C are intercoiled or interwoven as illustrated in Fig. 26, each with the two adjacent wires, in such manner as to avoid all occasion for separate warp and woof wires. Each of the sections A, B, C etc., consists of a flattened helix so flattened (as shown particularly in Fig. 25) as to lie very nearly in one plane. The convolutions of each wire section are staggered with respect to the convolutions of the two adjacent wire sections, but only a portion of a phase (half a phase in the construction shown). The wire coiling devices employed are themselves of well known construction (except in the respects hereinafter noted) comprising (see Figs. 22–25 inclusive, also Figs. 6 and 7) a flat coiling blade 13 surrounded, through a portion of its length, by a coiling die 12 which has the form of a hollow helical ribbon, the adjacent turns of which are separated slightly so as to provide a helical slot 12$^a$ (Figs. 7 and 25) through which the wire to be coiled may travel. This coiling device winds the wire as a flattened helix closely enveloping the coiling blade 13 (as shown particularly in Fig. 6, wherein two separate and distinct coiling blades 13 are shown, each surrounded by a coiling die 12 and each closely enveloped by a wire section A). In the operation of the machine, the first wire section (A, for example) is wound up by one of these coiling devices 12—13, as indicated in Fig. 22. Such section is cut off (by means hereinafter described) and is held temporarily in the position shown, while the next wire section B, is wound and interwoven or intercoiled with the section A. As previously explained, with reference to Fig. 26, this next wire section, B, should have its convolutions staggered, with respect to the convolutions of the section A, but half a phase. Such staggering might be effected by moving the wire section A lengthwise, half a phase, but this is objectionable in that it would involve, after the weaving is well started, the shifting back and forth, laterally, of a considerable portion at least, of the netting already woven. Therefore, I prefer, instead of shifting the already coiled sections laterally, to shift axially the coiling die 12 to an extent sufficient to produce the desired phase-staggering of the successive wire sections. Therefore, as indicated in Fig. 23, for the coiling of the wire section B (the section following next after the section A) the coiling die 12 is shifted backward axially half a phase; as a result of which the section B is staggered with respect to the section A, but half a phase; and this section B, as it leaves the coiling blade 13, will twist into engagement with the coils of section A, as indicated in Fig. 23. The interwoven section A is then lifted a suitable distance, and, the coiling die 12 being returned to first position, as indicated in Fig. 24, the third wire section C, is formed and caused to engage with the coils of section B. The coils of the section C then correspond exactly with the coils of the section A, but are staggered half a phase with respect to the coils of section B. The weaving of the netting proceeds in the manner described, alternate sections B, D, etc., and A, C, E etc., being intercoiled or interwoven, and being all of the same length, though each wire section is staggered with respect to the two adjacent wire sections, but half a phase.

Referring now to Figs. 1 and 2, 1 designates a bed-plate upon one end of which are mounted upright standards 2 which support two reels or spiders 3, for holding wire from which the coiled wire-sections of the netting are to be formed; which reels or spiders are loosely mounted upon opposite ends of a shaft 4 having its bearings within the standards 2.

The spiders or reels 3 are in the present instance provided with suitable arms 5 to the ends of which are secured flanged sleeves 6 by means of suitable bolts 7. A number of holes 7ª are provided for the bolts 7 to permit of the flanged sleeves 6 being set at various distances from the hubs so as to vary the capacity of the reels.

Upon the bed-plate 1 are also mounted three frame standards 8, 9 and 10, on top of which are mounted duplicate wire coiling devices 11 (see Figs. 6 and 7). One wire coiling device is situated on one side of the machine and receives wire from the wire reel on the same side of the machine; the other wire coiling device being situated on the other side of the machine and receives wire from the wire reel on its side of the machine; all as shown in Figs. 1 and 2. It is usually customary to insert suitable wire stretching devices between the reels and the coiling devices, but as these stretching devices form no part of the present invention they are not shown.

The machine shown being a double machine, to make two independent nettings, and the two wire coiling devices 11 being alike, only one will be described.

In the present instance the coiling device comprises a hollow die 12 (see Figs. 6 and 7) provided with a helical opening 12ª which extends from one end of the die to the other. A coiling blade 13, one end of which is secured to a shaft 14, (see Figs. 1, 2 and 4) is adapted to fit loosely in said die. The shaft 14, to which said coiling blade is secured, is journaled in a suitable bracket 15, and also upon the frame standard 8 (see Figs. 1 and 4.) For suitably rotating the coiling blade 13 a gear 16, secured on the shaft 14, is arranged to engage a gear 17 loosely mounted on the main driving shaft 18 of the machine. A suitable clutch 19 is provided for engaging the gear 17 intermittently to operate the coiling device, a suitable friction device 20, adjacent the driving pulley 21 being provided for obviating undue shock in starting the machine.

The wire A as it comes from the reel is wound about the flat coiling blade 13 and is drawn along the spiral openings 12ª, in the die 12, at the same time, thereby bending the wire and feeding it outward, as shown in Fig. 7.

Referring now to Figs. 6 and 7: To facilitate removal and replacement of the wire coiling dies 12 (as required, for example, when the size of the mesh is to be changed) the wire coiling die 12 is held between two clamping jaws 22 mounted to move transversely in the dove-tailed groove 24 of the slide 23. The jaws 22 are held in position and operated by means of a right- and left-handed screw 25, having a hand wheel 26, the middle portion of the screw being journaled in a boss 27 secured to the slide 23.

The slide 23 is arranged to slide in a suitable dovetailed groove 28 of the ways 29, suitable adjustable stops in the form of screws 30 being provided for limiting the movement of the slide. To the bottom of the slide 23 is secured a projecting member 31 having a longitudinal recess 32 in which is slidably mounted a cross piece 33, through the center of which is threaded a screw 34. The ends of the screw 34 are loosely mounted in the projecting member 31, a collar 35 being secured to one end of said screw and a hand wheel 36 secured to the other end, which permits of the cross piece 33 being moved back and forth along said recess. The ends of said cross piece 33 extend beyond the sides of the projecting member 31, both ends of said cross piece being engaged by the inner ends of the recessed portions of the fork 37, the outer end of which is provided with suitable lugs, to which one end of the lever 38 is pivoted at 37ª. The lever 38 is secured intermediate of its length to a rock shaft 39, to which is secured an arm 40, the lower end of the lever 38 being provided with a roller 41 which engages the cam groove of the cam 42.

From the above it will be seen that when the cam 42 is rotated, in the operation of the machine, the lever 38 will be vibrated back and forth about the shaft 39, the vibrations of the lever being controlled by the shape of the cam 42, in which the roller 41, secured to the lower end of the lever 38, operates. The vibration of the lever 38 vibrates the wire coiling device, through the medium of the fork 37, to which one end of the lever 38 is pivoted, the other end of the fork 37 engaging the projecting ends of the cross piece 33, the position of which is regulated by means of the hand wheel 36 so as to give a certain amount of lost motion in the operation of the lever 38 to move the wire coiling device. The position of the cross piece 33, in Fig. 7, is such that when the fork 37 is moved to the right by the further movement of the cam 42, the inner end of the recessed portions of the fork will not come in contact with the ends of the cross piece to move the wire coiling device, until the fork has been moved a slight distance. When the lever 38 is forced to the left on the return movement, the inner side of the fork 37 adjacent the pin 37ª engages the right-hand side of the projecting member 31 after a certain amount of lost motion is taken up, just as was previously the case when the wire coiling device was moved to the right.

The wire coiling device 11 is moved forward or backward a distance equal to one half the pitch of the coils of the wire, every time a new wire section is to be added to the netting. By referring to Fig. 7, it will be seen that the wire coiling device 11 has been moved, by the action of the cam 42, to its extreme left-hand position, the coiling device having just been moved from its extreme right-hand position, in which position the wire section marked B, having reached the desired length, was cut off, to permit of the next wire section marked C being advanced into the position shown, wherein its convolutions are staggered with respect to those of section B. The wire coiling device is moved forward as just described to permit of the new length of twisted wire section C, in its forward movement, to intermesh with the previously formed wire section marked B.

When each wire section A, B, C., etc., has reached the required length, it is cut off, as hereinafter described, and then the coiling device, 11, is moved by the action of the cam 42, forward or backward, as may be required, a distance equal to half the pitch of the convolutions, so that the wire section next formed will have its convolutions staggered with respect to the convolutions of the wire section just previously formed.

In the movement back and forth of the wire coiling device it is to be noted that the coiling blade 13 does not move but remains always in the same position. It is also to be noted that the die 12 only moves forward or backward immediately after the previously formed wire section has been cut off; at other times, or while the wire section is being formed the die 12 remains stationary.

The cam 42, which moves the wire coiling device forward or backward, is secured to a shaft 43 provided with a spiral gear 44, which meshes with a spiral gear 45 secured to the secondary shaft 46 at right angles to shaft 43. The shaft 46 is also provided with a gear 47, which meshes with a gear 48 loosely mounted on the main driving shaft 18 and adapted to be engaged by the clutch 19, in the operation of the machine.

Suitable cutting devices are provided for cutting off the wire sections in the present instance; but these cutting devices are both alike and only one will be described.

Suitable shearing cutters 50 are adjustably mounted in the ends of two levers 51, which are loosely mounted, intermediate of their length, upon a shaft 52. The lower ends of the levers 51 are pivoted respectively to one end of two links 53, the other end of the links 53 being pivoted to one end of a fork 54 adjustably connected to a rod 55, to form a differential toggle. The lower end of the rod 55 is pivotally mounted on a disk 56, eccentric to a shaft 57, which is provided with a gear 58, which meshes with a gear 59 on the secondary shaft 46.

From the above it will be seen that when the secondary shaft 46 is rotated in the operation of the machine, the rod 55 will be moved to operate the toggle to open or close the cutting levers 51. By referring to Fig. 6 it will be seen that the cutting levers 51 are in open position, but when it is desired to cut off one of the wire sections, the cutting levers 51 are operated through the medium of the secondary shaft 46, which operates the toggle, to force the upper ends of the levers 51, carrying the cutters 50, together, to cut off the wire section.

As the wire forming the wire sections is twisted into two different vertical planes, and as the forward and backward positions of the wire coiling device alternately presents the wire to the cutters in two different planes, it is necessary for the cutting devices to cut the wire as it is presented in either position. It is for this reason that the levers 51 are pivoted to the shaft 52, which permits of the cutters operating to cut the wire when it is presented in either plane, as shown in the right and left hand cutting devices shown in Fig. 6. It will be seen from the above that when the cutting levers 51 are forced together one of the cutters 50 will come in contact with the wire, to be cut, before the other; but due to the pivoting of the cutting levers 51 and the flexibility of the toggle the cutting levers 51 will automatically adjust themselves to operate the cutters to cut the wire in whatever position it is presented.

The clutch 19 (Figs. 1, 2, 4 and 5) is arranged to engage the gear 48 so as to turn the secondary shaft 46, to which the gear 47 is secured, one complete revolution, the clutch being forced out of engagement with the gear 48 at the end of one revolution of the shaft 46, by means of an arm 60 loosely mounted on the hub of the gear 47. The gear 47 is provided with a projection 61 which in the single rotation of the gear 47 engages the side of the arm 60 raising the same until the cam 62, on the arm, engages the projecting roller 63 on the lever 64 which operates the clutch 19 to disengage the gear 48, the shaft 46 having been turned one complete revolution. The clutch 19 is provided with a projection 65 which is adapted to engage the end of the arm 60 as soon as the cam 62 has forced the clutch 19 out of engagement with the gear 48, so as to force the cam 62 entirely past the roller 63 to move the clutch 19 into engagement with the gear 17, whereupon the arm 60 drops by its own weight to the position shown in Figs. 4 and 5.

When the clutch 19 is in the position shown in Fig. 4, power is transmitted from the main shaft 18 to the wire coiling blade 13, through the medium of the gear 17 which meshes with a gear 16 secured to the shaft 14 to one end of which the coiling blade 13 is fastened.

The rotation of the coiling blade 13, as just described, draws the wire from the reel 3 and forces it through the die 12, thereby forming one wire section of the netting. When the wire section has reached the desired length the clutch 19 is operated to disengage the gear 17, thereby stopping the further operation or rotation of the wire coiling blade 13. When the clutch 19 is operated to stop the rotation of the wire coiling blade 13, the clutch is forced into engagement with the gear 48 so as to rotate the secondary shaft 46, one complete revolution, at the end of which the arm 60 disengages the clutch 19 forcing the same into engagement with the gear 17, as before described.

In the single rotation of the secondary shaft 46, as just described, the eccentric 56 is operated to cut off the wire section, the cam 42 rotating, on the idle portion of its cam groove, until the cutting device has operated to cut off the wire section previously formed, after which the working portion of the cam groove in the cam 42 operates to move the wire coiling device either forward or backward as above described. In the present instance the cam 42 turns only one-half a revolution for a complete cycle of operations, or for one revolution of the shaft 46, it being noted that in one cycle of operation the cam 42 operates to move the wire coiling device forward, and in the subsequent cycle of operation operates to move the wire coiling device backward.

From the above it will be seen that when the clutch 19 is shifted to the right, as shown in Fig. 4, the clutch is in position for operating the wire coiling blade 13 to produce any desired length of wire section. When the wire section has been made of the desired length, the clutch 19 is shifted to the left to operate first, the wire cutting device, and then the shifting of the wire coiling device, after which the clutch 19 is again shifted to the right, as shown in Fig. 4, and as before described to again operate the wire coiling blade 13 to produce a new length of wire section.

In addition to automatically shifting the clutch 19 to the right by means of the arm 60, after the wire cutting device has been operated, and the wire coiling device shifted, as before described, automatic means are also provided for disengaging the clutch 19 from engagement with the gear 17 to stop the operation of the wire coiling blade 13, after the same has turned a certain number of revolutions to produce a certain length of wire section, the clutch being forced to the left to again operate the wire cutting device, and shift the wire coiling device.

The clutch 19, as before described, is engaged by the forked end of a lever 64 by means of pins 66, the lower end of the lever 64 being secured to the shaft 67 to which is also secured a lever 68 provided, at one side of its outer end, with a notched projection 69. The notched projection 69 on the end of the lever 68 is adapted to engage the lower end of a lever 70 which is pivoted at 71. From the above it will be seen that when the upper end of the lever 70 is moved to the right the lower end of the lever will disengage the notched projection 69 on the side of the lever 68, permitting the lever 68 to move upward by the action of the spring 72, one end of which is secured to the frame of the machine, and the other end to one end of a short lever 73 secured to the shaft 67. This upward movement of the lever 68 moves the lever 64, also secured to the shaft 67, to shift the clutch 19 into engagement with the gear 48.

The clutch 19 is automatically shifted out of engagement with the gear 17 into engagement with the gear 48 by means of an automatic timing device which operates the end of the lever 70.

The timing device (see Figs. 4, 5 and 19) in the present instance comprises a ratchet wheel 80 loosely mounted on the stud 81 secured to the frame. An arm 82 is also loosely mounted upon the stud 81, and is provided with a pawl 83 which engages the teeth of the ratchet wheel 80. The upper end of the arm 82 is provided with a roller 84 which engages the cam disk 85 secured to one of the coiling blade shafts 14; the roller 84 being kept in contact with the cam 85 by means of a spring 86, one end of which is secured to the arm 82 and the other end to the frame. The cam disk 85 is arranged to operate the arm 82 at the end of each complete revolution of the coiling blade 13, thereby moving the pawl 83 to advance the ratchet wheel 80 one tooth. The ratchet wheel 80 is advanced, tooth by tooth, for every complete rotation of the coiling blade 13, and until the nose 87, secured to the ratchet wheel 80, comes in contact with the end of the lever 70 to move the same, thereby disengaging the other end of the lever 70 from the notched projection 69 on the lever 68, to operate the clutch 19 as before described. As the ratchet wheel 80 is advanced by the movement of the pawl 83 the ratchet wheel is held in advanced position by means of a spring pressed pawl 88 secured to the frame.

When the ratchet wheel 80 has been advanced far enough for the nose 87 to trip the lever 70, to release the lever 68, so as to operate the clutch 19, the upward movement of the lever 68 engages the pin 89 on the end of the bar 90 to move the same upward. The bar 90 is provided with pins 91 and 92 which respectively engage the pawls 88 and 83 to move the same out of engagement with the ratchet wheel 80. As soon as the pins 91 and 92 move the pawls 88 and 83 out of engagement with the ratchet wheel 80, the ratchet wheel is moved back to its starting position by means of a flexible cord 93, one end of which is wound about the hub of the ratchet wheel 80, the other end of the cord 93 being secured to one arm of a bell-crank lever 94 pivoted to the shaft 67, the other arm of the bell-crank lever being secured to one end of a spring 95 secured to the frame 9.

The ratchet wheel 80 is moved backward after tripping the lever 70, as just described, until an abutment 96, on the front of the hub of the ratchet wheel 80, comes in contact with a shoulder on the back of a setting arm 97. The ratchet wheel 80 remains in this position until the clutch 19 is again operated to turn the wire coiling blade, at which time the lever 68 is depressed so as to permit the bar 90 to drop the pawls 88 and 83 thereby again engaging the ratchet wheel 80. The depression of the lever 68 also permits the spring 98 to draw the lower end of the lever 70 into engagement with the notched projection 69 on the lever 68 to lock the clutch 19 in engagement with the gear 17.

The setting arm 97, which regulates the starting position of the ratchet wheel 80 is loosely mounted on the stud 81 in front of the ratchet wheel 80, the setting arm being provided with a shoulder 99 which engages the abutment 96 on the hub of the ratchet wheel 80, when the ratchet wheel 80 is moved to its starting position by means of the flexible cord 93 as before described. The setting arm 97 is provided with a toothed screw bolt 100 which is adapted to engage the toothed periphery of a timing disk 101, keyed to the end of the stud 81. The timing disk 101 is provided with the same number of teeth as the ratchet wheel 80. It is to be noted that the nose 87, which trips the lever 70, is secured to the ratchet wheel 80 on a radial line with the working edge of the abutment 96, on the ratchet wheel 80, and it is also to be noted that the shoulder 99 on the setting arm 97 is in line with the toothed screw bolt 100; so that when the ratchet wheel 80 is moved to its starting position the nose 87 will be in radial alinement with the tooth on the timing disk engaged by the toothed screw bolt 100 on the setting arm 97.

The setting arm 97 being loose on the stud 19, the same can be set at any desired position about the timing disk 101 so as to bring the shoulder 99 on the setting arm in line with any desired tooth on the timing disk, the teeth of which are preferably numbered beginning with the tooth on the time disk which is opposite the end of the lever 70 when the same is tripped by the nose 87 on the ratchet wheel 80. The number of teeth on the ratchet wheel 80 are the same as the number of teeth on the timing disk 101, the ratchet wheel being advanced one tooth for every revolution of the coiling blade 13, so if it is desired to produce a certain length of wire section represented, for example, by forty-five revolutions of the coiling blade 13, the setting arm 97 is set as shown in Fig. 4, opposite the tooth numbered 45.

When the setting arm 97 has been set opposite the number 45 on the timing disk, it will be seen that the abutment 96 on the ratchet wheel 80, will engage the shoulder 99 on the back of the setting arm 97 so that it will take forty-five revolutions of the coiling blade 13 to advance the ratchet wheel tooth by tooth, for the nose 87, on the ratchet wheel 80, to trip the lever 70, to shift the clutch 19 to stop the wire coiling blade. After the lever 70 has been tripped by the nose 87 and the clutch 19 operated, as just described, it will be seen that the upward movement of the lever 68 raises the bar 90 thereby disengaging the pawls 88 and 83 from the ratchet wheel 80 so as to permit the spring 95, through the medium of a flexible cord 93, to turn the ratchet wheel back to its starting position. When the clutch 19 is shifted again into engagement with the gear 17 the lever 68 is lowered permitting the pawls 88 and 83 to again engage the ratchet wheel.

If it is desired to produce a greater or less length of wire section than is produced when the setting arm 97 is set for forty-five revolutions of the coiling blade 13, as shown in Fig. 4, the bar 90 can be raised by hand to release the pawls 88 and 83, so as to release the ratchet wheel which can be moved to a new starting position by the movement of the setting arm 97 to the number on the timing disk representing the desired number of revolutions of the coiling blade.

As each length of wire section is finished and cut off, the wire coiling device is shifted so that the new length of wire section will intermesh with the previously formed wire section, as previously described. This shifting of the wire coiling device either forward or backward a distance equal to one-half the pitch of the coils of the wire, every time a new length of wire section is added to the netting would make the wire sections of different lengths, provided the timing device always gave the same number of revolutions to the coiling blade 13. In order to overcome this difficulty the timing device is arranged to give one more revolution to the coiling blade 13 every time the coiling device is shifted backward, the coiling blade 13 therefore being given one less revelation every time the coiling device is shifted forward.

In order to give one more revolution to the coiling blade 13 every time the coiling device is shifted backward, there is provided a link 102 pivoted at one end to the timing disk 101, and at the other end to the arm 40, secured to the rock shaft 39, which is rocked by the lever 38, through the medium of the cam 42. The arm 40 is pivoted to the end of the link 102 by means of a pin 103 which is adapted to engage a slot 104 in the end of the link 102, so that when the arm 40 is moved toward the left, in the forward movement of the coiling device, it will operate the link 102, but when the arm 40 is moved to the right, in the backward movement of the coiling device the pin 103 in the arm 40 will not engage the link 102 but will move freely in the slot 104. The timing disk 101 is as before described keyed to the stud 81, the key slot 105 (Fig. 19) in the timing disk 101 being made a little wider than the key 106 to permit the timing disk 101 to be moved forward or backward one tooth. From the above it will be seen that when the wire coiling device is moved forward the arm 40 will pull the link 102 to the left to turn the timing disk 27 one tooth forward, thereby forcing the shoulder 99 on the setting arm 97, which is secured to the timing disk 101, to turn the ratchet wheel 80 forward one tooth. When the arm 40 is moved to the right, in the backward movement of the coiling device, the link 102 is released, thereby permitting the abutment 96, on the ratchet wheel 80, which engages the shoulder 99 on the setting arm 97 secured to the timing disk 101, to turn the timing disk backward one tooth by the action of the flexible cord 93.

When the timing disk is in the position shown in Fig. 4 it is in the normal starting position, in which position the wire coiling device is in its forward position, the timing disk being held in this position through the medium of the link 102 so that the coiling blade 13 will be stopped in the operation of the machine at the end of forty-five revolutions, for which the arm 97 has been set. When the coiling blade has been revolved forty-five revolutions to produce a certain length of wire section and the wire cut off, the wire coiling device in the further operation of the machine will be moved backward, thereby permitting the timing disk to turn backward one tooth as before described. When the timing disk is moved backward one tooth the starting point of the nose 87 is thereby set back one tooth, so that the nose 87 will not trip the lever 70 until the coiling blade 13 has made forty-six revolutions, to produce a length of wire section that is one coil longer than the previously formed wire section which was made when the coiling device was in its forward position. From the above it will be seen that when the wire coiling device is in its forward position the timing device is arranged to control the timing of the coiling blade, to produce a wire section that has one coil less than when the wire coiling device is in its backward position.

As before stated the wire coiling device is moved forward or backward a distance equal to one half the length of one of the coils of the wire, every time a new length of twisted wire section is to be added to the netting, so as to permit of the new length of twisted wire section in its forward movement, to intermesh with the previously formed wire section. The shifting of the coiling device either forward or backward a distance equal to one-half the length of one of the coils of the wire, makes it necessary to add one complete coil to every other wire section.

By referring to Fig. 22, which shows the wire coiling device 11 in its forward position, it will be seen that a certain length of wire section A has been made, after which the wire section is cut off on the dotted line $x$—$x$. After the wire section A has been cut off, the wire coiling device is moved backward, a distance equal to one-half the length of one of the coils, to the position shown in Fig. 23, so that when the wire section B is formed its coils will intermesh with the coils of the wire section A, the wire section B being cut off on the line $x$—$x$ as shown in Fig. 24. After the wire section B has been cut off the wire coiling device is again moved forward a distance equal to one half the length of wire of the coils, to the position shown in Fig. 24, so that when the wire section C is formed its coils will intermesh with the coils of the wire section B.

In order to make all of the different wire sections of equal length, so as to compensate for the forward and backward movement of the coiling device, required to interweave the different wire sections, it is necessary to add one more coil to the wire sections produced when the coiling device is in its backward position. By referring to Fig. 23 it will be seen that the new section B will have to have five complete coils to reach the left-hand end of the previously made section A, the starting point of the section C being one-half coil behind the cutting line $x$—$x$, to which position the end of the wire has been shifted, by the coiling device, after the wire section A has been cut off. By referring to Fig. 24 it will be seen that the new section C will have to have four complete coils to reach the left-hand end of the previously made sections A and B, the starting point of the section C being one-half coil in front of the cutting line $x$—$x$ to which position the end of the wire has been shifted, by the coiling device, after the wire section B has been cut off. From the above it will be seen that when the wire coiling device is in its backward position, as shown in Fig. 23, it is necessary to provide one more complete coil of wire, which necessitates the coiling blade 13 making one more complete revolution than is necessary when the coiling device is in its forward position, as shown in Figs. 22 and 24, which is automatically taken care of by the timing device.

As the wire is twisted by the coiling device into a flat helix, it moves forward, as above described, and as shown in Fig. 7, the twisted wire in its forward movement being held in position and guided by means of a tubular guide 107, (Figs. 1 and 3) which is open at the top throughout its entire length as shown in Fig. 8. As the machine is built as a double machine two guides 107 are provided but as both guides are alike only one will be described. The guide 107 is supported upon the cross channels 108 and 109, the ends of which are mounted upon two longitudinal channels 110 and 111 secured to the uprights 112, 113, 114 and 115.

The interweaving or intermeshing of the wire sections, as above described, forms the netting which passes over suitable rollers 116 mounted upon the shaft 117 secured to the frame channels 118. The rollers 116 are preferably supported so that the netting will hang in a vertical plane over the slot in the interweaving guide 107 as shown in Fig. 8. The netting is wound upon a take-up roller 119 removably supported on the frame, the roller 119 being provided with detachable flanges which can be detached when it is desired to remove the netting from the roller. The roller 119 is turned to wind up the netting as it is made by means of an arm 120 one end of which is provided with a plurality of pivoted gripping fingers 121 the movements of which are regulated by means of pins 122. The other end of the arm 120 is bifurcated and embraces the secondary shaft 46, the arm being provided with a roller 123 which engages a cam 124 on the shaft 46. A spring 125, one end of which is secured to the arm 120 and the other end to the shaft 46, is provided for keeping the roller 123 in engagement with the cam 124. As the secondary shaft 46 is rotated, in the operation of the machine, the arm 120 will be moved longitudinally back and forth, by the action of the cam 124, the gripping fingers 121 engaging the periphery of the netting roll to wind the same upon the roller 119. A plurality of gripping fingers 121 are provided to insure at least one of the gripping fingers engaging the periphery of the netting roll. The cam 124 is arranged to move the arm 120 a distance equal to the width of one wire section, the arm 120 being free to move about the secondary shaft 46 as the gripping fingers 121 are raised by the increasing diameter of the netting roll, so that the netting roll will always be advanced a distance equal to the width of one wire section regardless of the diameter of the netting roll.

As the machine is a double machine two arms 120 are operated by the same cam 124, otherwise the means for winding the netting are duplicated.

To insure the netting being lifted the proper distance at the proper time wire lifting devices are provided, which are, in the present instance, situated just above the tubular guides 107.

As the machine is a double machine and as two similar lifting devices are provided for each netting only one lifting device will be described.

The lifting device in the present instance comprises two similar sprocket wheels 130 and 131 mounted upon the shaft 132 supported upon brackets 133 adjustably secured to the frame upon the longitudinal channels 134 and 135, as shown in Figs. 3 and 8.

The sprocket wheels 130 and 131 are spaced apart a distance equal to one-half the pitch of the coils of the wire as shown in Figs. 3 and 20. The teeth on the sprocket wheels 130 and 131 are both alike, the wheels being set on the shaft 132 so that the teeth on both wheels are arranged alternately with respect to each other, as shown in Figs. 8 and 21. The teeth on the sprocket wheels 130 and 131 are arranged to engage the joints of the netting, the teeth of both wheels being adapted to always engage the netting at three joints, one tooth of one sprocket wheel engaging the netting at one joint, while two teeth of the other sprocket wheel engage the netting at two joints, and when, in the operation of the machine, the sprocket wheels are turned to lift the netting the first-named sprocket wheel engages the netting at two joints and the last-named sprocket wheel engages the netting at one joint, and so on, as shown in Figs. 8, 20 and 21.

To insure the engagement of the teeth of the sprocket wheels 130 and 131 with the joints of the netting, as above described, suitable guides 136 are provided for holding the netting. The guides 136 are, in the present instance, situated between the sprocket wheels 130 and 131, and are secured at their upper ends to the cross pieces 137 mounted on the frame.

The sprocket wheels 130 and 131 are turned, in the operation of the machine, to lift the netting, through the medium of a ratchet wheel 138 secured to the shaft 132 between the sprocket wheels. The ratchet wheel 138 is arranged to be operated by means of a spring-pressed pawl 139, pivoted to one end of a bar 140 slidably mounted in brackets 141. The lower end of the bar 140 is slidably secured to one end of a lever 142 which is pivoted at its other end to the frame. The lever 142 is pivotally connected to one end of a link 143, the lower end of which is slotted to embrace the secondary shaft 46, upon which is mounted a cam 144 arranged to engage two rollers 145 on the link 143.
The teeth on the ratchet wheel 138 are equal to the sum of the teeth on the sprocket wheels 130 and 131, so that when the pawl 139 is operated, as before described to advance the ratchet wheel 138 one tooth, the sprocket wheels 130 and 131 will be advanced only half a tooth, so as to lift the netting a distance equal to the width of one wire section. By referenec to Figs. 8, 20 and 21, it will be seen that the sprocket wheel 130 engages only one joint of the netting, whereas the sprocket wheel 131 engages two joints of the netting, but when, during the operation of the machine, the ratchet wheel 138 is advanced one tooth to thereby advance the sprocket wheels one half tooth, to lift the netting a distance equal to the width of one wire section, the sprocket wheel 130 will engage the netting at two joints and the sprocket wheel 131 will engage the netting at one joint.
In order to lock the sprocket wheels 130 and 131 in position after they have been moved to lift the netting, locking hooks 146 are provided which are pivoted at one end to the frame, the other end being arranged to engage the teeth of the sprocket wheel. The hooks 146 are operated to release the sprockets by means of a pin 147 which extends on opposite sides of the bar 140 to which it is secured. The hooks 146 are each provided with a pivoted lug 148 which lugs are adapted to be engaged by the ends of the pin 147 when the rod 140 is moved downward to advance the sprocket wheels.
When the ends of the pin 147 engage the lugs 148 on the downward movement of the rod 140, to release the hooks from engagement with the sprocket wheels, the lugs 148 are so arranged, in relation to the ends of the pin 147, that the ends of the pin will move past the lugs on the hooks to permit the hooks to move back again into engagement with the sprocket wheels by the action of the springs 149 attached to the hooks, the pawl 139, on the rod 140 having advanced the ratchet wheel 138 one tooth. As the teeth on the sprocket wheels 130 and 131 are in alternate relation with each other, only one of the hooks 146 engages one of the sprocket wheels at a time to hold the sprocket wheels in locked position.

The lifting device, as above described, is arranged to be operated through the medium of the secondary shaft 46, to lift the netting a distance equal to the width of one wire section, just after the wire coiling device has finished coiling a new wire section, and just previous to the time the cutting device is operated to cut off the new wire section, so that the new wire section will be suitably held in the tubular guide 107, to allow another wire section to be interwoven therewith. By referring to Fig. 23 it will be seen that when the wire section marked B has been twisted to the desired length, as shown in dotted lines, the previously formed wire section marked A will be lifted to the position shown in Fig. 24 to thereby support the wire section marked B in position to permit of the wire section C being interwoven with the wire section marked B.

In order to complete the netting it is desirable to provide either or both sides of the netting with a selvage wire. As the machine is a double machine making two independent nettings and as both sides of each netting are provided with a selvage wire, four selvage wire devices are provided; and as all the selvage wire devices are alike only one will be described.

The selvage wire device (see Figs. 9–18 inclusive) in the present instance comprises gripping fingers 150 the engaging ends of which are notched, as shown in Fig. 14, so as to hold the joint formed by two wire sections, at the sides of the netting, together with the selvage wire Z, firmly in place. The gripping fingers 150 are pivoted to the sides of the casing 151, and are arranged to be operated by one end of the adjustable cam blocks 152, the other ends of which are provided with rollers 153 which are adapted to engage the cammed periphery of the cam disk 161 against which the rollers 153 are held by means of the springs 154. The rear ends of the gripping fingers 150 are kept in contact with the cam blocks 152 by means of a U-shaped spring 155 placed between the forward ends of the gripping fingers. The selvage wire device also comprises in the present instance four forming tools 156, 157, 158, and 159 which are slidably mounted in the casing 151 between the gripping fingers. The front ends of the tools 156—159 are provided with suitable cam surfaces which are adapted to engage the ends of the two wire sections forming the joint held by the gripping fingers. The rear ends of the tools 156—159 are provided with rollers adapted to engage suitable cam grooves in the sides of the cam disks 160, 161, 162, also mounted in the casing 151 upon the shaft 163. The shaft 163 is operatively connected to the spiral gear 164 which meshes with a spiral gear 165, mounted on a shaft 166, which is operated by the secondary shaft 46, by means of the sprocket wheels 200 and 201 and the chain 202.

The selvage wire device, as above described, is arranged to be operated, through the medium of the secondary shaft 46, to attach the selvage wire Z to the side of the netting, just after the lifting device has operated to lift the netting a distance equal to the width of one wire section. After the netting has been lifted, as above described, the cam disk 161 operates to close the gripping fingers 150 so as to hold the joint formed by two wire sections together with the selvage wire Z. The gripping fingers of the wire selvage device are preferably arranged to grip and hold the joint at the side of the netting that is in line with the joint which is held in place between the two teeth of the sprocket wheel of the lifting device, which supports the netting at one joint as before described.

When the gripping fingers have gripped the joint and selvage wire as above described, and as shown in dotted lines in Fig. 14, the cams 160 and 162 operate to move the tools 156 and 158 into engagement with the loose ends of the wire sections of the joint held by the gripping fingers to bend the same into the position shown in Figs. 15 and 16. When the tools 156 and 158 have bent the loose ends of the wire sections, as just described, the cam 161 operates to move the tools 157 and 159 into engagement with the partially bent ends of the wire sections, to bend the same about the selvage wire Z, as shown in Figs. 17 and 18.

When the loose end of the wire sections have been bent about the selvage wire to securely fasten it to a joint at the side of the netting the further movement of the cams operates to withdraw the tools and open the gripping fingers.

The selvage wire Z comes from an independent source and is guided through suitable eyelets 167 over a suitable roller 168 secured to the wire selvage device as shown in Fig. 9.

After the selvage wire device has finished attaching the selvage wire to one joint, as above described, the netting, in the operation of the machine, will be lifted a distance equal to the width of one wire section; such being the case it will be seen that the wire selvage device just described will have an idle operation as there will be no joint to engage, until, in the further operation of the machine, the netting has again been raised a distance equal to the width of a wire section, when the wire selvage device will engage another joint to attach the selvage wire.

The operation of the machine is as follows:

The wire for making the netting is first wound upon the reels 3, and the ends of the wire led to the two separate wire coiling devices 11, so as to make two independent nettings. The setting arm 97 is then adjusted on the timing disk to control the length of the wire sections to produce a certain width of netting, the parts being in the position shown in Fig. 4. The main shaft 18 is then started with the clutch 19 in engagement with the gear 17 to operate the coiling blades 13 of both wire coiling devices. When the wire coiling blades have made the predetermined lengths of wire sections, the timing device operates to shift the clutch 19 into engagement with the gear 48. The shifting of the clutch 19 by the operation of the timing device, stops both wire coiling devices and forces the clutch into engagement with the gear 48 to turn the secondary shaft 46 one complete revolution.

One complete revolution of the secondary shaft 46 operates first, the wire lifting devices for each netting, through the medium of the cams 144 mounted on the secondary shaft 46, which turns the sprocket wheels 130 and 131; second, both wire cutting devices through the medium of the eccentric disks 56, operated by the secondary shaft 46 through the gears 58 and 59; third, the selvage wire devices for each netting, through the medium of the spiral gears 164 which mesh with a spiral gear 165 on the shaft 166 operated by the secondary shaft 46 by means of the sprocket chain 202; fourth, the wire coiling devices by means of the cams 42 mounted on the shaft 43 connected to the secondary shaft 46 by means of the spiral gears 44 and 45; fifth, the take-up by means of the cam 124 mounted on the secondary shaft 46 through the medium of the arms 120; sixth, the arm 60 mounted on the secondary shaft 46 through the medium of the pin 61 to stop the secondary shaft 46 at the end of one revolution, the projection 65 on the clutch 19 engaging the end of the arm 60 to force the clutch 19 again into engagement with the gear 17, all of the operating parts having assumed their normal position.

If desired the wire coiling devices can be arranged to make nettings of different wire mesh, and it is obvious that one wire coiling device can be arranged to produce one size netting, while the other wire coiling device is arranged to produce a different size netting, at one and the same time, the different parts of the machine all working together.

It is also obvious that the machine can be made as a single machine to produce only one netting, however, the double machine in the present instance operates practically as a single machine and produces a double output.

The present double machine is so constructed, and the devices for producing each netting so arranged, that the mechanism which operates and controls the devices for making one netting, also operates and controls the devices for making the other netting. This double or twin machine is equally balanced, takes up but little more room than a single machine, and can be operated with but little more power than a single machine.

It is also obvious that the netting can be made without a selvage wire, or the netting can be made with a selvage wire or either or both sides of the netting. A netting provided with a selvage wire on either or both sides of the netting is very advantageous for a great many uses, especially for fences, making a fence that is neat in appearance, strong, durable and easily put up as the selvage wire is of great assistance in facilitating the proper stretching of the fences.

The selvage wire can be attached by using only one set of tools, for example, tools 156 and 157, of the selvage wire device, so as to bend only one of the loose ends of the wire at each of the joints at the side of the netting, the other loose end of the wire at each joint being permitted to stick up to act as a barb. A barbed-top rail fence is often desired for inclosing cattle and the like.

Instead of moving the wire coiling device longitudinally back and forth, to bring the end of each new wire section into proper position to intermesh with the previously formed wire section, as previously described and as shown in Figs. 22 to 25, the wire coiling device can be operated, to turn the same back and forth about its own axis, to accomplish the same result.
By referring to Figs. 27 and 28 it will be seen that the wire coiling device or die 12$^b$ is the same as the die 12 previously described. In the present instance the die 12$^b$ is supported in a cylindrical casing 250 by means of wedges 251. The casing 250 is loosely mounted in the frame and is provided with a gear 252, which meshes with a gear 253, connected to an intermittent gear 254 by means of a link 255. The gear 254 meshes with an intermittent gear 256 mounted on the secondary shaft 46.

The intermittent gears 254 and 256 are preferably made, as shown in Fig. 28, so that when the secondary shaft 46 is rotated one complete revolution, as before described, the intermittent gear 256 will engage the intermittent gear 254 at the end of a half revolution, to rotate the intermittent gear 254 a half revolution. When the gear 254 is rotated a half revolution the link 255 rotates the gear 253, to turn the wire coiling devices 12$^b$ forward one hundred and eighty degrees. When, in the further operation of the machine, a new wire section is made and the secondary shaft 46 is again operated, the intermittent gears 256 and 254 operate the link 255, to turn the wire coiling devices back one hundred and eighty degrees, into position for intermeshing a new wire section with the coils of the previously formed wire section.

By referring to Fig. 30 it will be seen that a certain length of wire section $d$ has just been completed, at which time the clutch 19 is shifted to the left, to engage the gear 48, to turn the secondary shaft 46 one complete revolution. During the first half of the one revolution of the secondary shaft 46 the wire coiling devices 12$^b$ are not moved, as there are no teeth on the first half of the intermittent gear 256. During the idle movement of the gear 256 the secondary shaft 46 operates the lifting devices and the cutting devices as previously described. The lifting devices, the take-up devices and the cutting devices are the same as those already described, in the specification, and operate in the same manner, so they will not be further described. In the present instance however, when the wire coiling devices are turned, instead of being moved longitudinally, the cutters 50 are preferably placed so that their cutting edges act in a vertical plane instead of in a horizontal plane, so that the edges of the cut wire sections will not interfere with each other when the wire coiling dies are turned.

When the secondary shaft has been turned a half revolution and the wire cutting device has cut the wire section $d$ on the dotted line $y$—$y$, the further half revolution of the shaft 46 turns the wire coiling die 12$^b$ and with it the wire coiling blade 13$^b$ forward one hundred and eighty degrees, into the position shown in Figs. 31 and 34. The coiling blade 13$^b$, while not secured to the coiling die 12$^b$, turns whenever the coiling die 12$^b$ turns, as the wire twisted about the coiling blade has sufficient friction to hold the coiling blade as the coiling die turns. The new wire section $e$ is then in proper position to be interwoven with the coils of the previously formed wire section $d$, in the further operation of the machine, the clutch 19 being again shifted to the right as shown in Fig. 27 to produce a new length of wire section $e$. When the wire section $e$ has been coiled to the required length, the clutch 19 is again shifted to the left, to operate the secondary shaft 46, which turns the wire coiling die 12$^b$ and with it the wire coiling blade 13ᵇ back one hundred and eighty degrees, to place the new wire section f in proper position to be interwoven with the previously formed wire section e, as shown in Figs. 32 and 35.

The timing device, which automatically controls the number of revolutions of the coiling blade 13ᵇ, to produce a certain length of twisted wire section, as shown in Fig. 27, is substantially the same as the timing device shown in Figs. 4 and 19, except that in the present instance the timing device is not provided with means for adding or subtracting one coil from succeeding wire sections, as the same is not required when the coiling device is turned back or forth, as in the present instance, and as shown in Fig. 29, the cam disk 85ᵇ is provided with two cam projections one hundred and eighty degrees apart, and the ratchet wheel 80ᵇ, as shown in Fig. 27, is provided with twice the number of teeth provided on the time disk 101ᵇ.

It is necessary to provide two projections on the cam disk 35ᵇ and twice the number of teeth on the ratchet wheel 80ᵇ, so that when the wire coiling device has been turned one hundred and eighty degrees in either direction, the roller 84ᵇ will always be adjacent one of the projections on the cam disk 85ᵇ, as shown in Fig. 27, so as to make all of the wire sections of equal length and to compensate for the turning back or forth of the coiling die and blade.

What I claim is:

1. A wire netting machine comprising in combination a wire coiling device and a wire coiling blade for making twisted wire sections, means for rotating said coiling blade, means for moving said coiling device back and forth, a timing device for controlling the number of revolutions of said coiling blade, and means connected to said timing device and actuated by the back and forth movements of said coiling device for varying the number of revolutions of said coiling blade.

2. A wire netting machine comprising in combination a wire coiling device and a wire coiling blade for making twisted wire sections, a lifting device and a wire cutting device, a main driving shaft for operating said wire coiling device and said wire coiling blade, and a secondary shaft for operating said lifting device and said cutting device.

3. A wire netting machine comprising in combination a wire coiling device and a wire coiling blade for making twisted wire sections, a lifting device and a wire cutting device, a main driving shaft for operating said wire coiling device and said wire coiling blade, and a secondary shaft for operating said lifting device and said cutting device, and means for controlling the operations of said main shaft and said secondary shaft.

4. A wire netting machine comprising in combination a wire coiling device and a wire coiling blade for making twisted wire sections, a lifting device and a wire cutting device, a main driving shaft for operating said wire coiling device and said wire coiling blade, and a secondary shaft for operating said lifting device and said cutting device, and a timing device for controlling the operations of said main shaft and said secondary shaft.

5. A wire netting machine comprising in combination a wire coiling device and a wire coiling blade for making twisted wire sections, a lifting device and a wire cutting device, a main driving shaft for operating said wire coiling device and said wire coiling blade, and a secondary shaft for operating said lifting device and said cutting device, and a timing device for controlling the operations of said main shaft to produce a certain length of wire section, said timing device being arranged to also control the operations of the secondary shaft to lift and cut the wire sections.

6. A wire netting machine comprising in combination a wire coiling device and a wire coiling blade for making twisted wire sections, and a wire cutting device comprising levers pivoted intermediate of their length and operated by a toggle to cut the wire sections in either of two vertical planes.

7. A wire netting machine comprising in combination a wire coiling device and a wire coiling blade for making twisted wire sections to form a netting, and a wire lifting device comprising sprocket wheels, the teeth of each wheel being arranged alternately with respect to each other and arranged to engage the netting to lift the same.

8. A wire netting machine comprising in combination a wire coiling device and a wire coiling blade for making twisted wire sections, a main driving shaft for operating said wire coiling blade, a cutting device and a lifting device, and a secondary shaft for operating said cutting device and said lifting device and for shifting said coiling device.

9. A wire netting machine comprising in combination a wire coiling device and a wire coiling blade for making twisted wire sections, a main driving shaft for operating said wire coiling blade, a cutting device and a lifting device, a secondary shaft for operating said cutting device and said lifting device and for shifting said coiling device, and a movable clutch adapted in one position to connect said main shaft with said coiling blade and in another position to connect said main shaft with said secondary shaft to operate said cutting device and said lifting device, and for shifting said coiling device.

10. A wire netting machine comprising in combination a wire coiling device and a wire coiling blade for making twisted wire sections, a main driving shaft for operating said wire coiling blade, a cutting device and a lifting device, a secondary shaft for operating said cutting device and said lifting device and for shifting said coiling device, and a movable clutch adapted in one position to connect said main shaft with said coiling blade and in another position to connect said main shaft with said secondary shaft to operate said cutting device and said lifting device, and for shifting said coiling device, and a timing device for controlling the movements of said clutch.

11. A wire netting machine comprising in combination a wire coiling device and a wire coiling blade for making twisted wire sections, a main driving shaft for operating said wire coiling blade, a cutting device, a lifting device and a selvage wire device, and a secondary shaft for operating said cutting device, said lifting device, said selvage wire device, and for shifting said coiling device.

12. A wire netting machine comprising in combination a wire coiling device and a wire coiling blade for making twisted wire sections, a main driving shaft for operating said wire coiling blade, a cutting device, a lifting device and a selvage wire device, a secondary shaft for operating said cutting device, said lifting device, said selvage wire device, and for shifting said coiling device, a movable clutch, and a timing device for controlling the movements of said clutch.

13. A selvage wire device comprising in combination a pair of gripping fingers for gripping the joint formed by the end of adjacent wire sections at the side of the netting together with the selvage wire, and a plurality of forming tools for binding the free ends of said wire sections about said selvage wire.

14. A selvage wire device comprising in combination a pair of gripping fingers for gripping the joint formed by the end of adjacent wire sections at the side of the netting together with the selvage wire, and a plurality of forming tools for binding the free ends of said wire sections about said selvage wire, means for operating said gripping fingers, and means for operating said forming tools.

15. A selvage wire device comprising in combination a pair of gripping fingers for gripping the joint formed by the end of adjacent wire sections at the side of the netting together with the selvage wire, and a plurality of forming tools for binding the free ends of said wire sections about said selvage wire, means for operating said gripping fingers, and means for operating said forming tools after said gripping fingers have been operated.

16. A selvage wire device comprising in combination a pair of gripping fingers for gripping the joint formed by the end of adjacent wire sections at the side of the netting together with the selvage wire, and a plurality of forming tools for bending the free ends of said wire sections about said selvage wire, means for operating said gripping fingers, and means for successively operating said forming tools.

17. A selvage wire device comprising in combination a pair of notched gripping fingers for gripping the joint formed by the end of adjacent wire sections at the side of the netting together with the selvage wire, and a plurality of forming tools for bending the free ends of said wire sections about said selvage wire.

18. A selvage wire device comprising in combination a casing, a pair of gripping fingers mounted in said casing and adapted to grip the joint formed by the end of adjacent wire sections at the side of the netting together with the selvage wire, and a plurality of forming tools mounted in said casing for bending the free ends of said wire sections about said selvage wire.

19. A selvage wire device comprising in combination a casing, a pair of gripping fingers mounted in said casing and adapted to grip the joint formed by the end of adjacent wire sections at the side of the netting together with the selvage wire, a plurality of forming tools mounted in said casing for bending the free ends of said wire sections about said selvage wire, and a plurality of cams for operating said gripping fingers and said forming tools.

20. A selvage wire device comprising in combination a casing, a pair of gripping fingers mounted in said casing and adapted to grip the joint formed by the end of adjacent wire sections at the side of the netting together with the selvage wire, a plurality of forming tools mounted in said casing for bending the free ends of said wire sections about said selvage wire, and a plurality of cams mounted in said casing for operating said gripping fingers and said forming tools.

21. A wire netting machine for making twisted wire sections to form a netting, means for lifting said netting as it is formed, and a selvage wire device arranged to attach the selvage wire to the side of the netting directly opposite said means for lifting the netting.

22. A wire netting machine comprising in combination a wire coiling device and a wire coiling blade for making twisted wire sections, and a selvage wire device secured to said machine adjacent said coiling device, and means for operating said coiling device in conjunction with said selvage wire device.

23. A double wire netting machine for making two independent nettings comprising in combination separate wire coiling devices and separate wire coiling blades and a single timing device for simultaneously controlling said wire coiling devices and said wire coiling blades.

24. A double wire netting machine for making two independent nettings comprising in combination separate wire coiling devices and separate wire coiling blades, a main driving shaft for operating said wire coiling blades, lifting devices, cutting devices and shifting devices, and a secondary shaft for operating said lifting devices, said cutting devices, and said shifting devices.

In testimony whereof I have signed this specification in the presence of two subscribing witnesses.

MAX B. A. DORING.

Witnesses:
M. I. TRIMBLE,
PAUL H. FRANKE.